United States Patent Office 3,441,602
Patented Apr. 29, 1969

3,441,602
1,1 - DIPHENYL - 1 - LOWER ALKOXY - 3 - OR - 4-AMINO-ALKANES AND THE SALTS THEREOF
Roderich Höllinger and Wolf Wendtlandt, Linz, Austria, assignors to Osterreichische Stickstoffwerke Aktiengesellschaft, Linz, Austria
No Drawing. Filed Mar. 21, 1966, Ser. No. 535,715
Claims priority, application Austria, Mar. 22, 1965, A 2,558/65
Int. Cl. C07c 87/04
U.S. Cl. 260—501.12           11 Claims

ABSTRACT OF THE DISCLOSURE

Basic diphenylmethyl ethers of the formula

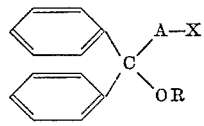

in which R is alkyl with four carbon atoms as a maximum, A is ethylene or trimethylene and X is lower dialkylamino, benzyl (lower alkyl) amino or dibenzylamino, their salts and lower alkylammoniumhalides and a process of preparing same by reacting the corresponding diphenylmethyl ethers with alkali metal amides and subsequently with compounds of the formula Hal—A—X, both steps being carried out in liquid ammonia as solvents. The novel basic diphenylmethyl ethers have antitussive properties.

---

This invention relates to basic ethers and non-toxic salts thereof and to a process for the preparation thereof.

In accordance with the present invention there is provided a basic ether having the formula:

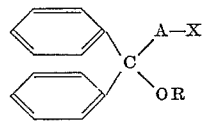

in which R is an alkyl group containing up to four carbon atoms, A is an ethylene or trimethylene group and X is a dialkylamino, benzyl (lower alkyl) amino, or dibenzylamino group, non-toxic acid addition salts thereof and alkyl ammonium halides thereof.

Especially preferred compounds of Formula I are those compounds in which R is a methyl, ethyl or propyl group and X is a dimethylamino, diethylamino or methylbenzylamino group.

The compounds of this invention have very good cough-suppressing effects, which in their effectiveness are roughly equivalent to codeine. Thus for example the compound 1,1-diphenyl-1-n-propoxy-3-dimethylaminopropane has an $ED_{50}$ of about 25 mg./kg. when tested on guinea pigs in a mist chamber, using a spray from 20% citric acid. The compounds of Formula I are distinguished from codeine by the fact that they do not show any depressive effect on breathing, which is characteristic of narcotic cough medicines and which is considered to be a disadvantage of these. On the contrary, the compounds of this invention have a stimulating effect on the breathing which is considered desirable in such cough medicines. The compounds of Formula I are further distinguished by an advantageous ratio of toxicity to effectiveness so that they have a favourable therapeutic breadth of application. They are therefore well suited for use as substances for suppressing cough irritation, and they are preferably administered orally for this purpose, in admixture with a pharmacologically-acceptable carrier, for example in the form of tablets, dragees or syrup.

The invention also provides a process for the preparation of a basic ether having the Formula I above which comprises reacting a diphenylmethylether having the formula:

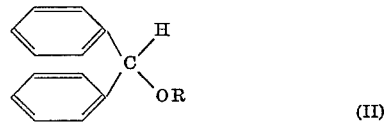

in which R is defined as above, in liquid ammonia as the solvent, with at least an equivalent amount of an alkali metal amide, and reacting the resulting alkali metal compound having the formula:

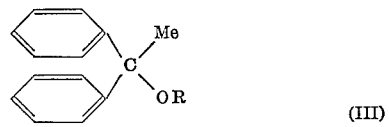

in which R is defined as above and Me is an alkali metal atom, again in liquid ammonia, with a basic substituted alkyl halide having the formula:

Hal—A—X           (IV)

in which Hal is a halogen atom and A and X are defined as above, or with a salt thereof. The compounds so obtained may, when they are formed as bases, be converted to acid addition salts, or, by means of alkyl halides, into alkyl ammonium halides. If salts are obtained as the final products then the free bases may be obtained from these.

In order to carry out the above reaction the alkali metal compound of Formula III is first of all prepared by reacting the ether of Formula II with an alkali metal amide, for example, with sodium amide, potassium amide or lithium amide, in liquid ammonia. For this reaction it has proved desirable to produce the alkali metal amide in situ in liquid ammonia by adding an alkali metal and a suitable catalyst such as for example ferric nitrate, to the ammonia and only then introducing the ether of Formula II. Alternatively, it is also possible to start immediately with the finished alkali metal amide. At least one mole of alkali metal amide per mole of ether is necessary for the reaction but the alkali metal amide may also be used in excess.

During the condensation with the basic substituted alkyl halide of Formula IV it has in many cases proved to be of advantage to add the compound of Formula IV to the reaction medium as a solution in an inert solvent, for example ether. The compounds of Formula IV may however also be used in the form of their salts, but in that case the amount of alkali metal amide used has to be increased to the point where there is a sufficient excess present for it to bind the acid ion.

The working up of the reaction mixture is preferably started by distilling off the ammonia with gentle warming. The basic ether may then be extracted from the reaction mixture with the aid of a mineral acid, and may be isolated in the usual manner. If the corresponding salt of the basic ether is of low solubility in water, it precipitates on acidification and may be isolated in the solid form. The salt so obtained may be converted to the base in the usual manner. It is also possible to produce other salts of the compounds. Examples of acid addition salts are the hydrohalides, the sulphates, the succinates, the tartrates and the cyclohexylsulphamates. Examples of alkyl ammonium halides are the methylhalides.

The ethers of Formula II which are used as the starting compounds may be obtained by etherification of the appropriate secondary carbinol with the appropriate alcohol in an acid medium.

The following examples illustrate the invention.

EXAMPLE 1

9.7 g. of sodium are stirred in 700 cc. of liquid ammonia containing 30 mg. of ferric nitrate as catalyst until the blue colour disappears. Thereafter 79.3 g. of benzhydryl methyl ether are added dropwise. Hereupon the sodium compound is formed, with the mixture turning red. Thereafter, a solution of 59.7 g. of β-diethylaminoethyl chloride in 60 cc. of ether is added dropwise and stirred for a further 2 hours during which time the mixture loses its colour. The ammonia is evaporated off by gentle warming and is simultaneously replaced by ether. 200 cc. of water are then added, the mixture acidified with hydrochloric acid, and the aqueous layer is separated, rendered alkaline, and extracted with ether. On distilling off the ether, 81.0 g. of 1,1-diphenyl-1-methoxy-3-diethylaminopropane are obtained in the form of a viscous oil, corresponding to a yield of 68% of theory; this may be distilled at 128° to 133° C. and 0.2 torr and after solidification has a melting point of 37° to 39° C. The hydrochloride has a melting point of 170° to 173° C.

EXAMPLE 2

27.7 g. of potassium are reacted with 700 cc. of liquid ammonia as described in Example 1, and treated dropwise first with 138.4 g. of benzhydryl methyl ether dissolved in 150 cc. of ether and then with 139.7 g. of β-benzylmethylaminoethyl chloride dissolved in 150 cc. of ether. The mixture is stirred for a further half hour, the ammonia evaporated off by gentle warming with simultaneous addition of 200 cc. of ether, and the reaction mixture decomposed with 200 cc. of water and acidified with hydrochloric acid. The crystalline hydrochloride is filtered off. 253 g. of 1,1-diphenyl-1-methoxy-3-methylbenzylaminopropane hydrochloride, are obtained, corresponding to a yield of 95% of theory. After recrystallisation from water, the melting point was 198° to 199° C. The base, of melting point 57° to 58° C., may be obtained by dissolving the hydrochloride in water with heating, and rendering the mixture alkaline.

EXAMPLE 3

45 g. of sodium amide are introduced into 1.5 litres of liquid ammonia, 213 g. of benzhydryl methyl ether diluted with 200 cc. of absolute ether are added dropwise, and the mixture stirred for 1 hour. A mixture of 292.8 g. of dibenzylaminoethyl chloride and 200 cc. of absolute ether is then added dropwise and the resulting mixture is stirred for 2 hours. Thereafter, the ammonia is distilled off and replaced by 600 cc. of ether. 400 cc. of water are added and the mixture acidified with 330 cc. of 20% hydrochloric acid. On stirring, the hydrochloride of 1,1-diphenyl-1-methoxy-3-dibenzylaminopropane crystallises out. After filtering off and recrystallisation from alcohol of 50% strength by volume, 394 g. of a product of melting point 186° to 188° C. are obtained, representing 80% of theory. The base which is liberated from the hydrochloride in the usual manner has a melting point of 75° to 76° C.

The following compounds may be obtained in a similar manner to the procedure set out in the preceding examples:

1,1-diphenyl-1-n-propoxy-3-diethylaminopropane

Boiling point of the base 125° to 132° C./0.1 torr;
Melting point of the hydrochloride 161° to 163° C.

1,1-diphenyl-1-propoxy-3-dimethylaminopropane

Boiling point of the base 115° to 116° C./0.07 torr;
Melting point of the hydrochloride 172° to 175° C.

1,1-diphenyl-1-ethoxy-3-diethylaminopropane

Boiling point of the base 119° to 120° C./0.07 torr;
Melting point of the hydrochloride 163° to 166° C.

1,1-diphenyl-1-butoxy-3-diethylaminopropane

Boiling point of the base 133° to 135° C./0.1 torr;
Melting point of the hydrochloride 138° to 140° C.

1,1-diphenyl-1-ethoxy-3-dimethylaminopropane

Boiling point of the base 107° to 112° C./0.1 torr;
Melting point of the base 60° to 64° C.;
Melting point of the hydrochloride 205° to 207° C.

1,1-diphenyl-1-methoxy-3-dimethylaminopropane

Melting point of the base 78° to 80° C.;
Melting point of the hydrochloride 224° to 225° C.;
Melting point of the nitrate 175° to 175.5° C.;
Melting point of the D,L-malate 113° to 114° C.;
Melting point of the D,L-mandalate 174° to 176° C.;
Melting point of the succinate 124° to 126° C.;
Melting point of the D-tartrate 167.5° to 169° C.

1,1-diphenyl-1-butoxy-3-dimethylaminopropane

Boiling point of the base 132° to 135° C./0.2 torr;
Melting point of the hydrochloride 150° to 151° C.

1,1-diphenyl-1-isopropoxy-3-dimethylaminopropane

Boiling point of the base 115° to 124° C./0.1 torr;
Melting point of the hydrochloride 186° to 187° C. starting from new benzhydryl isopropyl ether;
Boiling point 149° C./7 torr.

1,1-diphenyl-1-isopropoxy-3-diethylaminopropane

Boiling point of the base 126° to 127° C./0.03 torr;
Melting point of the hydrochloride 206° to 208° C.;
Melting point of the hydrogen sulphate 147° to 151° C.

1,1-diphenyl-1-methoxy-3-diisopropylaminopropane

Boiling point of the base 139° to 142° C./0.05 torr;
Melting point of the base 58° to 65° C.;
Melting point of the hydrochloride 165° to 168° C.

1,1-diphenyl-1-ethoxy-3-diisopropylaminopropane

Boiling point of the base 140° to 143° C./0.05 torr;
Melting point of the hydrochloride 187° to 188° C.

1,1-diphenyl-1-propoxy-3-diisopropylaminopropane

Boiling point of the base 132° to 137° C./0.05 torr;
Melting point of the hydrochloride 152° to 154° C.

1,1-diphenyl-1-ethoxy-3-methylbenzylaminopropane

Boiling point of the base 171° to 173° C./0.07 torr;
Melting point of the hydrochloride 149° to 151° C.

1,1-diphenyl-1-propoxy-3-methylbenzylaminopropane

Boiling point of the base 173° to 176° C./0.15 torr;
Melting point of the hydrochloride 142° to 145° C.

1,1-diphenyl-1-butoxy-3-methylbenzylaminopropane

Boiling point of the base 176° to 178° C./0.1 torr;
Melting point of the base 50° to 51° C.

1,1-diphenyl-1-methoxy-4-dimethylaminobutane

Boiling point of the base 124° to 127° C./0.2 torr;
Melting point of the base 56° to 59° C.;
Melting point of the hydrochloride 159° to 161.5° C.

1,1-diphenyl-1-ethoxy-4-dimethylaminobutane

Boiling point of the base 118° to 123° C./0.1 torr;
Melting point of the base 56° to 61° C.;
Melting point of the hydrochloride 186° to 188° C.

1,1-diphenyl-1-propoxy-4-dimethylaminobutane

Boiling point of the base 123° to 125° C./0.1 torr;
Melting point of the hydrochloride 193° to 195° C.

1,1-diphenyl-1-butoxy-4-dimethylaminobutane

Boiling point of the base 128° to 129° C./0.05 torr;
Melting point of the hydrochloride 145° to 147° C.

1,1-diphenyl-1-methoxy-4-diethylaminobutane

Boiling point of the base 121° to 125° C./0.05 torr;
Melting point of the hydrochloride 131° to 134° C.

1,1-diphenyl-1-ethoxy-4-diethylaminobutane

Boiling point of the base 133° to 137° C./0.05 torr;
Melting point of the hydrochloride 145° to 147° C.

1,1-diphenyl-1-propoxy-4-diethylaminobutane

Boiling point of the base 141° to 144° C./0.07 torr;
Melting point of the hydrochloride 131° to 135° C.

EXAMPLE 4

2.3 g. of 1,1-diphenyl-1 - methoxy - 3 - diethylaminopropane are dissolved in 50 cc. of ether and treated with 5.5 g. of methyl iodide. After 2 days the resulting precipitate is filtered off and recrystallised from a mixture of benzene and acetone. The melting point of the 3,3-diphenyl-3-methoxypropyl-diethyl - methyl - ammonium iodide so obtained is 188.5° to 190° C.

The following were obtained in a similar manner:

3,3-diphenyl-3-propoxypropyl-diethyl - ammonium iodide, melting point 183° to 184° C.
3,3-diphenyl-3-butoxypropyl-diethyl-methyl - ammonium iodide, melting point 168.5° to 170° C.
3,3 - diphenyl - 3 - methoxypropyl - trimethylammonium iodide, melting point 208° to 209° C.

We claim:

1. A basic ether selected from the group consisting of compounds having the formula:

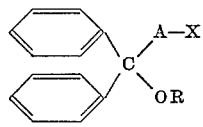
(I)

in which R is an alkyl group containing up to four carbon atoms, A is selected from the group consisting of ethylene and trimethylene and X is selected from the group consisting of the lower dialkylamino group, benzyl (lower alkyl) amino group and dibenzylamino group, the non-toxic acid addition salts thereof and the lower alkyl ammonium halides thereof.

2. A basic ether selected from the group consisting of compounds having the formula:

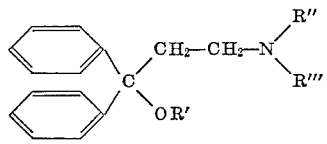

in which R' is selected from the group consisting of methyl, ethyl and propyl and R'' and R''' are each selected from the group consisting of methyl, ethyl and benzyl, the non-toxic acid addition salts thereof and the lower alkyl ammonium halides thereof.

3. A basic ether selected from the group consisting of compounds having the formula:

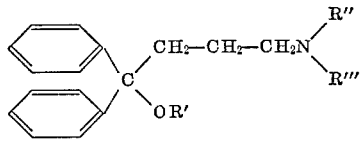

in which R' is selected from the group consisting of methyl, ethyl, propyl and R'' and R''' are each selected from the group consisting of methyl, ethyl and benzyl, the non-toxic acid addition salts thereof and the lower alkyl ammonium halides thereof.

4. 1,1-diphenyl-1-n-propoxy-3-dimethylaminopropane.
5. 1,1-diphenyl-1-methoxy-3-dimethylaminopropane.
6. 1,1-diphenyl-1-methoxy-3-diethylaminopropane.
7. 1,1-diphenyl-1-ethoxy-3-methylbenzylaminopropane.
8. 1,1-diphenyl-1-methoxy-4-dimethylaminobutane.
9. In a process for the preparation of a basic ether selected from the group consisting of compounds having the formula:

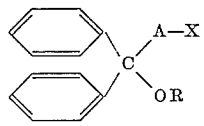
(I)

in which R is an alkyl group containing up to four carbon atoms, A is selected from the group consisting of ethylene and trimethylene and X is selected from the group consisting of the lower dialkylamino, benzyl (lower alkyl) amino group and dibenzylamino group, the acid addition salts thereof and the lower alkyl ammonium halides thereof, which comprises reacting a diphenylmethyl ether having the formula:

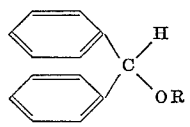
(II)

in which R is defined as above, in liquid ammonia as the solvent, with at least an equimolar amount of an alkali metal amide and reacting the resulting alkali metal compound having the formula:

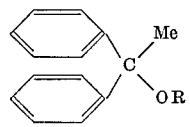
(III)

in which R is defined as above and Me is an alkali metal atom, again in liquid ammonia as the solvent, with a basic substituted alkyl halide selected from the group consisting of compounds having the formula

Hal—A—X            (IV)

in which Hal is a halogen atom and A and X are defined as above, and the salts thereof.

10. A process according to claim 9, in which the alkali metal amide needed for the production of the alkali metal compound of Formula III is prepared in situ in the liquid ammonia used as the solvent for the reaction.

11. A process according to claim 9, in which the basic substituted alkyl halide of Formula IV is introduced as a solution in an inert organic solvent.

References Cited

UNITED STATES PATENTS

| | | | |
|---|---|---|---|
| 2,884,456 | 4/1959 | Campbell | 260—570.8 |
| 2,989,533 | 6/1961 | Stein et al. | 260—570 XR |
| 3,157,656 | 11/1964 | Krapcho | 260—570 XR |

FOREIGN PATENTS 1,083,277   6/1960   Germany.

OTHER REFERENCES

Hauser et al., "Journal Organic Chemistry," vol. 23, pp. 916—18 (1958).

ROBERT V. HINES, *Primary Examiner.*

U.S. Cl. X.R.

260—501.18, 567.6, 64, 999, 583, 570.9, 570; 23—190; 424—330, 329